Aug. 30, 1927.
H. M. BENSON
1,641,021
SHOCK ABSORBER
Filed March 1. 1926
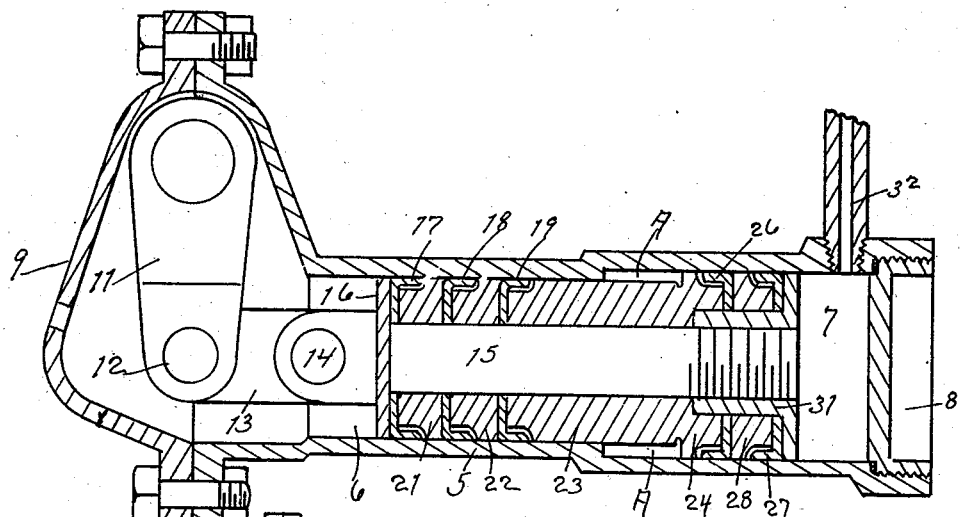
Fig. I.
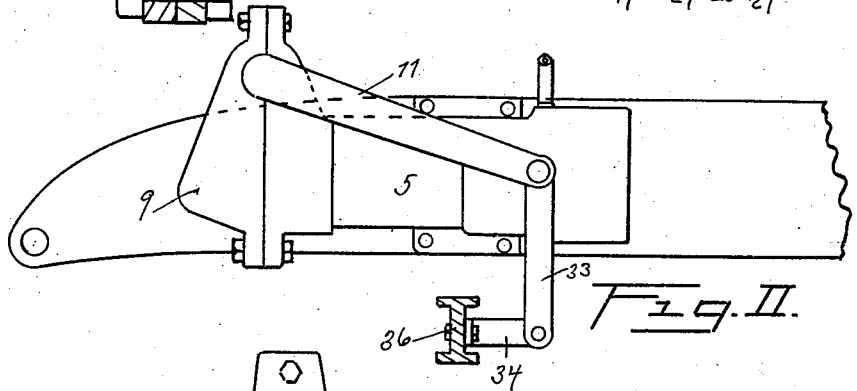
Fig. II.
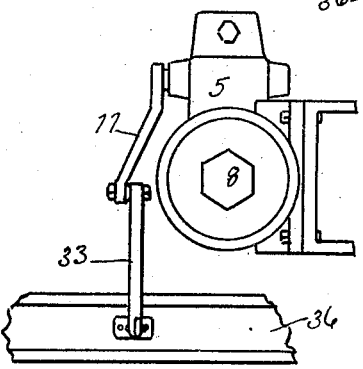
Fig. III.
INVENTOR.
H. M. BENSON
BY Victor J. Evans
ATTORNEY Patented Aug. 30, 1927.

1,641,021

UNITED STATES PATENT OFFICE.

HAROLD M. BENSON, OF OAKLAND, CALIFORNIA.

SHOCK ABSORBER.

Application filed March 1, 1926. Serial No. 91,529.

This invention relates to improvements in shock absorbers and has particular reference to that type commonly known as pneumatic shock absorbers.

The principal object of this invention is to produce a shock absorber which will function to decrease the amount of vibration commonly transmitted to the body of an automobile when a depression is encountered in the surface over which the vehicle is traveling.

Another object is to produce a device of this character which is simple in construction and therefore economical to manufacture.

Another object is to produce a device having a minimum amount of wear and therefore one which will last a considerable length of time without the necessity of repair.

A further object is to produce a device of this character which may be attached to a standard automobile without materially altering the construction of the same.

Other objects and advantages will be apparent during the course of the following description.

In the accompanying drawings forming a part of this specification, and in which like numerals are employed to designate like parts throughout the same, Figure I is a longitudinal cross-section of my shock-absorber, Figure II is a side elevation on a reduced scale showing my shock absorber attached to a portion of the chassis of an automobile, and Figure III is an end elevation of Figure II.

It is a well known fact that air is an extremely resilient medium and one which does not lose its elasticity as does rubber, springs and the like devices. I have therefore produced a device employing air under pressure in such a manner that all road shocks will be effectively absorbed.

In the accompanying drawings wherein for the purpose of illustration is shown a preferred embodiment of my invention, the numeral 5 designates a casting having a cylinder 6 and a cylinder 7. It will be noted that the cylinder 6 is of a smaller diameter than the cylinder 7. At 8 I have shown a plug adapted to close the end of the cylinder 7, while at 9 I have shown a cap which serves to enclose one end of a bell crank lever 11. This bell crank lever has pivoted thereto as at 12 a lever 13 which is in turn pivoted as at 14 to a piston rod 15. This piston rod carries a head 16 which is of substantially the same diameter as the cylinder 6.

At 17, 18 and 19 I have shown cup washers which are of the ordinary construction, and therefore need no further description. The cup washers 17 and 18 are separated by a spacer block 21, while a similar spacer block 22 separates the washers 18 and 19.

At 23 I have shown a filler block of the same diameter as the cylinder 6, which filler block is provided with a head 24 of substantially the same diameter as the cylinder 7. This head is adapted to contact a cup washer 26.

A similar cup washer is shown at 27, while a filler block 28 is interposed between these last mentioned cup washers. A nut 31 is threadedly engaged upon the end of the piston rod 15.

The result is that when the nut 31 is tightened, the washers and the filler blocks are all compressed as is clearly illustrated in Figure I.

At 32, I have shown a pipe which communicates with the cylinder 7 at a point to the rear of the washers 27 and 28. This pipe is adapted to conduct compressed air or gas from any suitable source to the chamber 7.

It is my intention to place a check valve in this pipe to prevent back pressure out of the cylinder 7 and to secure pressure from one of the cylinders of the engine of the car, upon which the device is attached.

The operation of my device is as follows:

Assuming that compressed air is conducted from the pipe 32 to the chamber 7, this air will leak past the washers 27 and 28 and fill the space A which surrounds the filler block 23. The air will be prevented from leaking any further by the washers 17, 18 and 19. The result of this pressure behind the piston will be to push outwardly upon that portion of the bell crank lever 11 which is within the device, which will result in the pressure being transmitted through a connecting link 33 to a securing lug 34. This lug is attached to the axle 36 of the machine thus tending to lift the chassis away from the axle.

When driving along a highway, and an obstruction is encountered the body of the vehicle will tend to move upwardly. This will result in the piston tending to move further toward the left of the drawings which will compress the air confined in the space A, thus checking the upward tendency of the vehicle body. The result being that the body of the car is supported to a large extent upon an air cushion.

It will thus be seen that I have provided a simple and efficient means for accomplishing the objects above set forth.

It is to be understood that the form of my invention herewith shown and described is to be taken as a preferred example of the same, and that various changes relative to the size, shape and arrangement of parts may be resorted to without departing from the spirit of the invention, or the scope of the subjoined claim.

Having thus described my invention, I claim:—

In a shock absorber of the character described adapted to be attached to an automobile having a chassis and an axle, a casting having cylinders formed therein, said cylinders being of different diameter, a piston positioned within said cylinder, said piston including a head, and a piston rod, a plurality of cup washers positioned on said rod, the free edges of said cup washers extending in a direction toward the larger cylinder of said device, spacer blocks interposed between said cup washers, a filler block positioned on said piston rod, said filler block having a head formed integral therewith and of a diameter equal to the larger of said cylinders, a cup washer abutting said head and having its free edge extending in a direction toward the smaller cylinder of said device, a filler block abutting said cup washer, a second cup washer similarly positioned to said last mentioned cup washer, a nut secured to said piston rod and adapted to compress said cup washers and said filler blocks, a plug adapted to be secured to said casting and adapted to seal one end thereof, a pipe communicating with the interior of said larger cylinder at a point adjacent said plug, a bell crank lever mounted on said casting and connecting with said piston, a link connecting said bell crank lever and the axle of said automobile.

In testimony whereof I affix my signature.

HAROLD M. BENSON.